US012798054B2

(12) United States Patent
Goichman et al.

(10) Patent No.: US 12,798,054 B2
(45) Date of Patent: Nov. 17, 2026

(54) MULTI-FORMAT VACUUM TABLE FOR FLATTENING ELECTRONIC COMPONENT PANELS

(71) Applicant: Orbotech Ltd., Yavne (IL)

(72) Inventors: Tal Goichman, Kiryat Ono (IL); Eyal Zalewski, Tel Aviv (IL); Mordechai Hai Hababo, Rosh Haaiin (IL)

(73) Assignee: KLA Corporation, Milpitas, CA (US)

( * ) Notice: Subject to any disclaimer, the term of this patent is extended or adjusted under 35 U.S.C. 154(b) by 302 days.

(21) Appl. No.: 18/647,966

(22) Filed: Apr. 26, 2024

(65) Prior Publication Data

US 2025/0269497 A1 Aug. 28, 2025

Related U.S. Application Data

(60) Provisional application No. 63/556,873, filed on Feb. 23, 2024.

(51) Int. Cl.
*B25B 11/00* (2006.01)
*B21D 1/00* (2006.01)

(52) U.S. Cl.
CPC .............. *B25B 11/005* (2013.01); *B21D 1/00* (2013.01)

(58) Field of Classification Search
CPC ....... B25B 11/005; B25B 11/00; B23Q 3/067; B23Q 3/088
See application file for complete search history.

(56) References Cited

U.S. PATENT DOCUMENTS 2,490,046 A * 12/1949 Genier ...................... B21D 1/00 254/100
5,372,357 A * 12/1994 Blaimschein ......... B25B 11/007 269/21
5,707,051 A 1/1998 Tsuji
5,805,408 A 9/1998 Maraschin et al.
6,702,268 B1 * 3/2004 Nascimben ............ B23Q 1/032 269/21
10,262,885 B2 4/2019 Jin et al.
11,664,264 B2 5/2023 Jeunink et al.
11,728,204 B2 * 8/2023 Verstreken .............. H10P 72/78 269/21
2005/0109590 A1 * 5/2005 Shen ...................... B25B 11/002 269/900
2006/0055073 A1 3/2006 Fayaz et al.
(Continued)

FOREIGN PATENT DOCUMENTS

CN 111653210 A 9/2020
CN 214203650 U 9/2021
(Continued)

*Primary Examiner* — Lee D Wilson
(74) *Attorney, Agent, or Firm* — DICKINSON WRIGHT PLLC

(57) ABSTRACT

A vacuum table for supporting and flattening an electronic component includes a base plate structure comprising a top surface defining a plurality of suction arrangements. The vacuum table also includes a plurality of lip seals operatively coupled to the base plate structure and extending upwardly beyond the top surface of the base plate structure, the plurality of lip seals arranged to define a plurality of portions of the vacuum table, wherein each of the plurality of portions of the vacuum table includes at least one of the plurality of suction arrangements therein.

16 Claims, 6 Drawing Sheets

(56) References Cited

U.S. PATENT DOCUMENTS

| | | | | |
|---|---|---|---|---|
| 2016/0111318 | A1* | 4/2016 | Ichinose | H10P 72/7612 269/21 |
| 2017/0345700 | A1 | 11/2017 | Oremus | |
| 2018/0108559 | A1 | 4/2018 | Balan et al. | |
| 2022/0130708 | A1* | 4/2022 | Verstreken | H10P 72/78 |
| 2022/0415699 | A1 | 12/2022 | Lee et al. | |
| 2025/0269497 | A1* | 8/2025 | Goichman | B25B 11/005 |

FOREIGN PATENT DOCUMENTS

| | | | |
|---|---|---|---|
| EP | 3282475 | A1 | 2/2018 |
| JP | 2018037469 | A | 3/2018 |
| JP | 2019004017 | A | 1/2019 |
| KR | 20140144369 | A | 12/2014 |
| KR | 20180069381 | A | 6/2018 |
| KR | 102467069 | B1 | 11/2022 |
| WO | 2020076949 | A1 | 4/2020 |

* cited by examiner

MULTI-FORMAT VACUUM TABLE FOR FLATTENING ELECTRONIC COMPONENT PANELS

CROSS-REFERENCE TO RELATED APPLICATION

This applications claims the benefits of priority to U.S. Provisional Patent Application Ser. No. 63/556,873, filed Feb. 23, 2024, the disclosure of which is incorporated by reference herein in its entirety.

FIELD OF THE INVENTION

The embodiments described herein relate to electronic component inspection and manufacturing systems and, more particularly, to a multi-format vacuum table for flattening panels.

BACKGROUND

Inspection processes are used at various steps during a manufacturing process to detect defects on wafers, panels or other electronic components to promote higher yield and quality in the manufacturing process, thereby obtaining higher profits. Additionally, processing steps may be performed on the electronic component, such as deposition on a substrate.

Many fabrication, metrology and defect inspection processes require loading wafers, panels or the like on a process machine table. The electronic components to be inspected or processed come in various formats, such as different widths, lengths and thicknesses, for example. The existing method for handling multiple formats is by using what may be referred to as a master plate for each category of component. A thin plate (e.g., 1 mm thick) typically covers all or most of the table vacuum area and includes an array of holes which correspond to a given panel area size, thus avoiding vacuum leakage. So, for each panel format there is a dedicated master plate with a unique pattern of holes.

If the panel is warped, external mechanical clamps are applied to exert a force on the peripheral area of the panel. Since the panel can be of various formats, there several solutions for adjustable format clamps, each typically requiring a complicated mechanism to adjust the compatible format. In some cases, since the panels are pressure sensitive, additional soft materials and soft springs are used in clamps to prevent breakage of the panel. The clamping force is normally activated by pneumatic pistons or electric actuators.

The requirement to manually replace master plates for each format swap takes time and manual labor, may break clean room requirements in some cases, and creates a sandwiched structure between a machined vacuum table and the panel, which may lead to additional warpage ("non-flatness") of the panel. As for the clamping requirement, such mechanical clamping is local, leading to uncontrolled contact stress in the clamped regions of the panel. The clamping is typically applied at the perimeter of the warped panel to avoid damaging the functional area of the panel. For brittle warped panels (e.g., glass) the local force application produces contact stresses and/or may break the panel by bending the raised edges. Additionally, the clamps have to be adjusted to different formats, thereby creating a cumbersome and complex clamping mechanism and process.

SUMMARY OF THE DISCLOSURE

According to one aspect of the disclosure, a vacuum table for supporting and flattening an electronic component includes a base plate structure comprising a top surface defining a plurality of suction arrangements. The vacuum table also includes a plurality of lip seals operatively coupled to the base plate structure and extending upwardly beyond the top surface of the base plate structure, the plurality of lip seals arranged to define a plurality of portions of the vacuum table, wherein each of the plurality of portions of the vacuum table includes at least one of the plurality of suction arrangements therein.

According to another aspect of the disclosure, a vacuum table for supporting and flattening an electronic component includes a base plate structure comprising a top surface and defining one or more interconnected channels and a plurality of through holes, the plurality of through holes extending from the plurality of interconnected channels and through the top surface of the base plate structure, and the plurality of through holes comprising a first suction arrangement and a second suction arrangement fluidly connected by the one or more interconnected channels. The vacuum table also includes a first valve positioned in the one or more interconnected channels, the first valve configured to selectively control airflow from the first suction arrangement to the second suction arrangement. The vacuum table further includes a plurality of lip seals coupled to the top surface and arranged to create a plurality of portions of the vacuum table, the first suction arrangement extending into a first portion of the plurality of portions, and the second suction arrangement extending into a second portion of the plurality of portions.

These aspects and other advantages and features are apparent from the following description taken in conjunction with the drawings.

BRIEF DESCRIPTION OF THE DRAWINGS

The subject matter that is regarded as embodiments of the invention is particularly pointed out and distinctly claimed in the claims at the conclusion of the specification. The features and advantages of the disclosed embodiments are apparent from the following detailed description taken in conjunction with the accompanying drawings in which:

DETAILED DESCRIPTION

Figure 1:
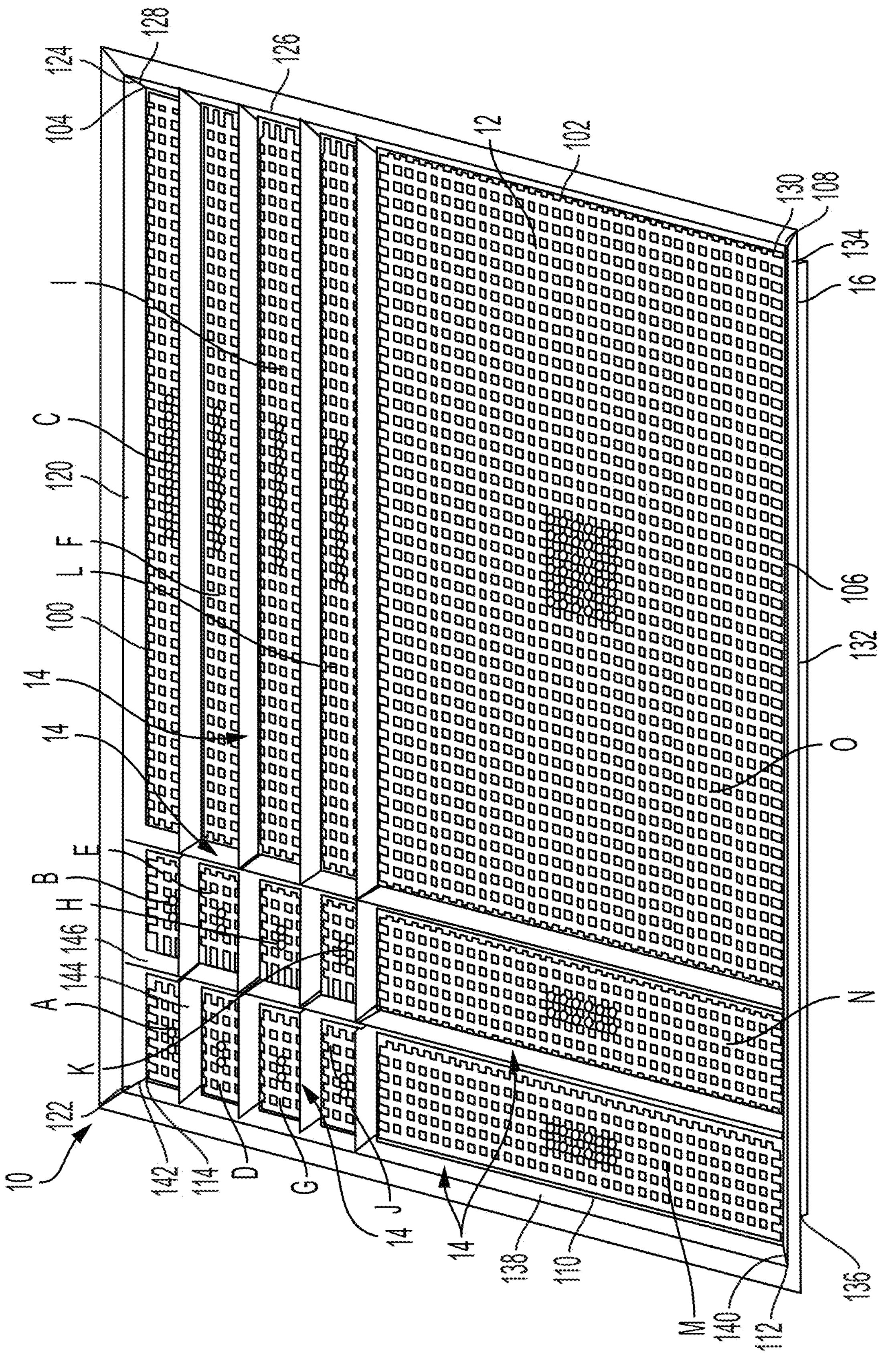
FIG. 1 is a top perspective view of a multi-format vacuum table.

Referring to the drawings, where the invention will be described with reference to specific embodiments, it is to be understood that the disclosed embodiments are merely examples of the invention that may be embodied in various and alternative forms. The drawings are not necessarily to scale, as some features may be exaggerated, reduced or simplified to show details of particular components. Therefore, specific structural and functional details disclosed herein and illustrated in the drawings are not to be interpreted as limiting, but merely as a representative basis for teaching one skilled in the art to variously employ the invention.

Referring to FIG. 1, a multi-format vacuum table is schematically shown and generally referenced with numeral 10. The multi-format vacuum table 10 may also simply be referred to as the vacuum table 10 herein. The vacuum table 10 is configured to be used in the inspection and manufacturing processing of electronic components. The electronic components may be any suitable wafer/substrate suitable substrates, panels for flat panel displays, solar panels, reticles or any other suitable object. Therefore, the term "electronic components", as used herein, refers generically to any of the aforementioned objects, but is not limited thereto.

The vacuum table 10 is constructed to support, flatten and retain electronic components of various types and sizes, including different widths, lengths and thicknesses on a top surface 12 of the vacuum table 10. The top surface 12 is segmented by lip seals 14 which protrude upwardly from the top surface 12 to define multiple portions which may be used to accommodate the different types and sizes of electronic components. In the illustrated embodiment, fifteen (15) portions are provided, with five rows of three columns present. The illustrated portions are referenced with letters A through O. The top surface 12 of the vacuum table 10 may define or extend between a first edge 100, a second edge 102, a third edge 106 and a fourth edge 110. Respective ends of the first edge 100 and the second edge 102 meet at a first corner 104 of the top surface 12. The second edge 102 extends away from the first corner 104 to meet the third edge 106 at a second corner 108. The third edge 106 extends away from the second corner 108 to meet the fourth edge 110 at a third corner 112. The fourth edge 110 extends away from the third corner 112 to meet the first edge 100 at a fourth corner 114.

A first lip seal 120 of the plurality of lip seals 14 extends from proximate the first edge 100 of the top surface 12 of the vacuum table 10. The first lip seal 120 extends between a first end 122 and a second end 124. A second lip seal 126 extends from proximate the second edge 102 of the top surface 12 and between a first end 128 and a second end 130. The first end 128 of the second lip seal 126 and the second end 124 of the first lip seal 124 are disposed adjacent to each other. A third lip seal 132 extends from proximate the third edge 106 of the top surface 12 and between a first end 134 and a second end 136. The first end 134 of the third lip seal 132 and the second end 130 of the second lip seal 126 are disposed adjacent to each other. A fourth lip seal 138 extends from proximate the fourth edge 110 of the top surface 12 and between a first end 140 and a second end 142. The first end 140 of the fourth lip seal 138 and the second end 136 of the third lip seal 132 are disposed adjacent to each other.

The above-described lip seals 120, 126, 132, 138 are positioned proximate the outer perimeter of the top surface 12 of the vacuum table 10 and may be collectively referred to as the exterior lip seals. The plurality of lip seals 14 also includes a plurality of interior lip seals to define the segments A-O with the exterior lip seals. For example, a fifth lip seal 144 extends between the fourth lip seal 138 and sixth lip seal 146 and be disposed generally parallel to, and spaced apart from, the first lip seal 120. At least a portion of a sixth lip seal 146 may extend towards the third lip seal 132 and between the first lip seal 120 and the fifth lip seal 144. The sixth lip seal 146 is disposed generally parallel to, and spaced apart from, the fourth lip seal 138. The orientation of the first lip seal 120, the fourth lip seal 138, the fifth lip seal 144, the sixth lip seal 146 and the top surface 12 define the first portion A. The remaining segments of segments A-O are defined in a similar manner with all or a portion of various lip seals 14.

While a particular segmentation embodiment is shown in FIG. 1 and other drawings, it is to be appreciated that any configuration of portions may be utilized. For example, any number of portions may be included and the sizes of the portions, relative to each other, may vary. Therefore, it is to be understood that the illustrated segmentation of portions is merely an example and is not limiting of the different portion configurations which may be provided.

The vacuum table 10 is a base plate structure 16 which has an area compatible with the largest format panel to be supported by the vacuum table 10. In some embodiments, this may be about 600 mm×600 mm or larger, with a thickness between about 20 mm and 30 mm. However, it is to be understood that the dimensions of the vacuum table 10 may vary depending on the particular objects to be supported, inspected and/or processed. The base plate structure 16 is a unitary, integrally formed plate in some embodiments, but it is possible that the base plate structure 16 is formed by a plurality of base plate structures. The top surface 12 of the base plate structure 16 may be machined or otherwise formed to be extremely flat, such as within 10 microns or less of flatness variation.

Figure 2:
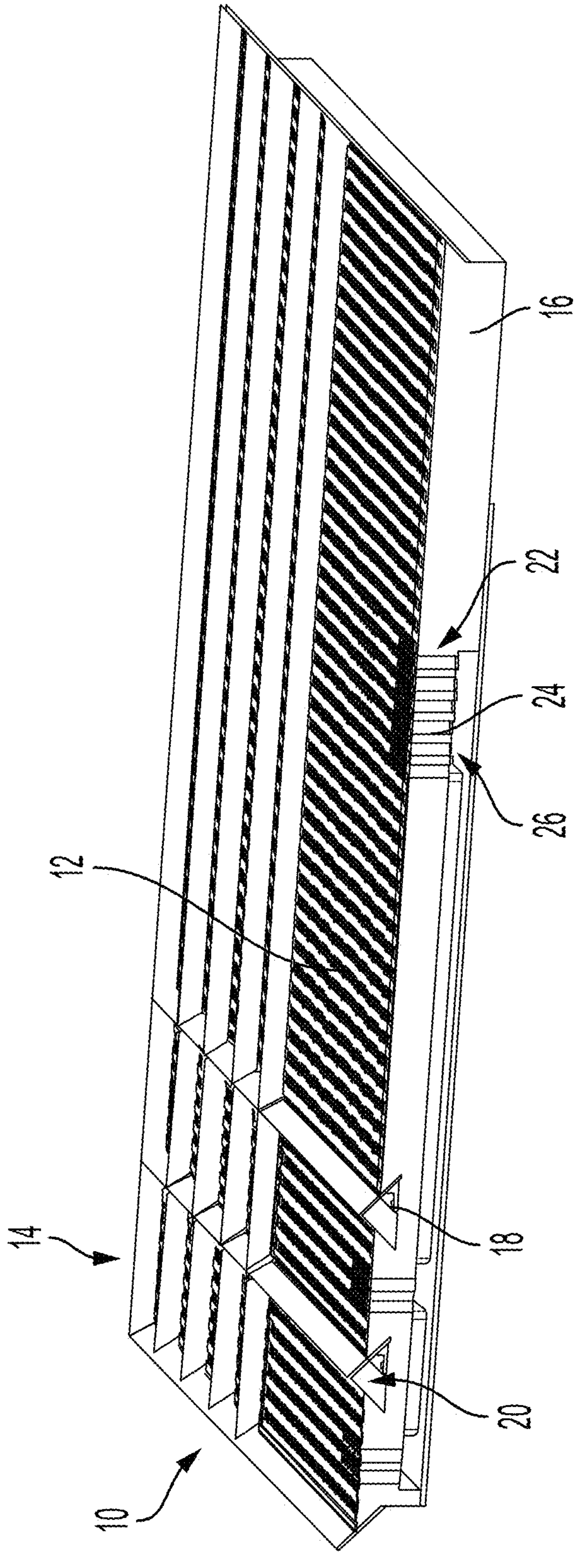
FIG. 2 is a front perspective view of the multi-format vacuum table.
Figure 3:
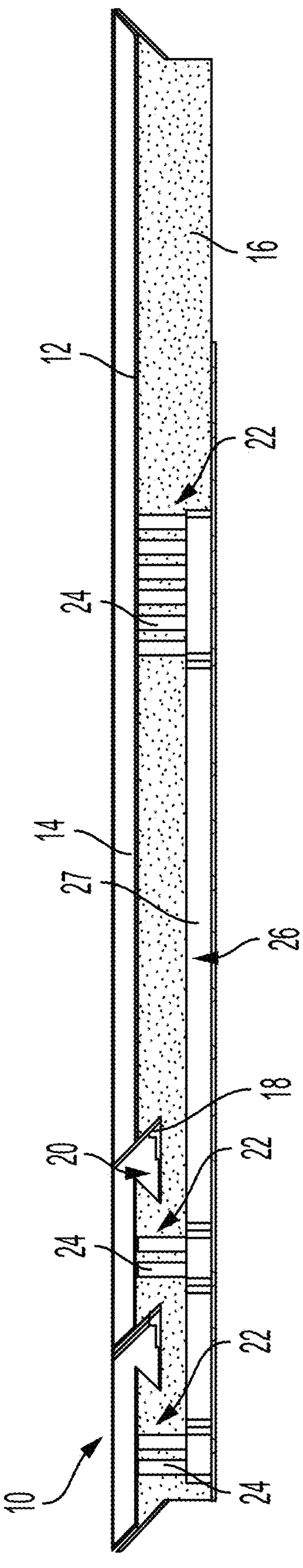
FIG. 3 is a front, elevation, cross-sectional view of the multi-format vacuum table.

Referring now to FIGS. 2 and 3, the lip seals 14 and the base plate structure 16 of the vacuum table 10 from which the lip seals 14 extend are shown in more detail. The lip seals 14 are mechanically secured to the base plate structure 16 in any suitable manner. In the illustrated embodiment, and by way of example, the lip seals 14 are clamped by a bracket 18 within a recessed area 20 of the base plate structure 16 and bolted to the base plate structure 16. Alternatively, magnets may be employed to retain the lip seals 14 within the recessed areas 20. The recessed areas 20 are troughs which extend along the base plate structure 16 and are sized and configured to receive a portion of the lip seals 14 therein. The lip seals 14 are flexible and are made of a soft, elastomeric material to be elastically deformable in some embodiments. The lip seals 14 extend upwardly out of the recessed areas 20 to protrude upwardly to an extent higher than the top surface 12 of the base plate structure 16. The lip seals 14 may extend upwardly at a non-vertical angle (i.e., non-parallel or non-perpendicular to plane of top surface 12). In some embodiments, the lip seals 14 extend upwardly at about 45 degrees relative to the top surface 12, but other angles are contemplated.

As shown, the lip seals 14 intersect with each other to define rectangular portions along the top surface 12 of the base plate structure 16. Therefore, four lip seals 14 define each portion—or format—to enclose a vacuum for the desired space to accommodate a specific format of electronic component, as disclosed herein. Although rectangular portions A-O are illustrated and described herein, it is within the scope of the disclosure to have the lip seals 14 define exclusively non-rectangular portions or a combination of rectangular portions and non-rectangular portions. For example, some or all of the portions A-O may be parallelograms, trapezoids, rhombuses, etc. Such shapes may be utilized to accommodate support and flattening of non-rectangular shaped panels.

Each portion A-O of the vacuum table 10 includes a respective suction arrangement 22 to provide a vacuum for each particular portion. Each suction arrangement 22 includes one or more vacuum tubes 24 which are open at the top surface 12 of the base plate structure 16 and extend downwardly into the base plate structure 16. The suction arrangements 22 are fluidly coupled to an airflow path network 26 defined within the base plate structure 16. The airflow path network 26 comprises a plurality of interconnected channels 27 extending throughout the base plate structure 16. The airflow path network 26 is fluidly coupled to a vacuum source (not shown). The airflow path network 26 includes valves or other fluid restricting devices which allow the vacuum for each suction arrangement 22 of each portion A-O to be selectively active or inactive. Alternatively, the vacuum for each suction arrangement 22 may be selectively controlled by providing individual vacuum sources for each suction arrangement 22.

Figure 4:
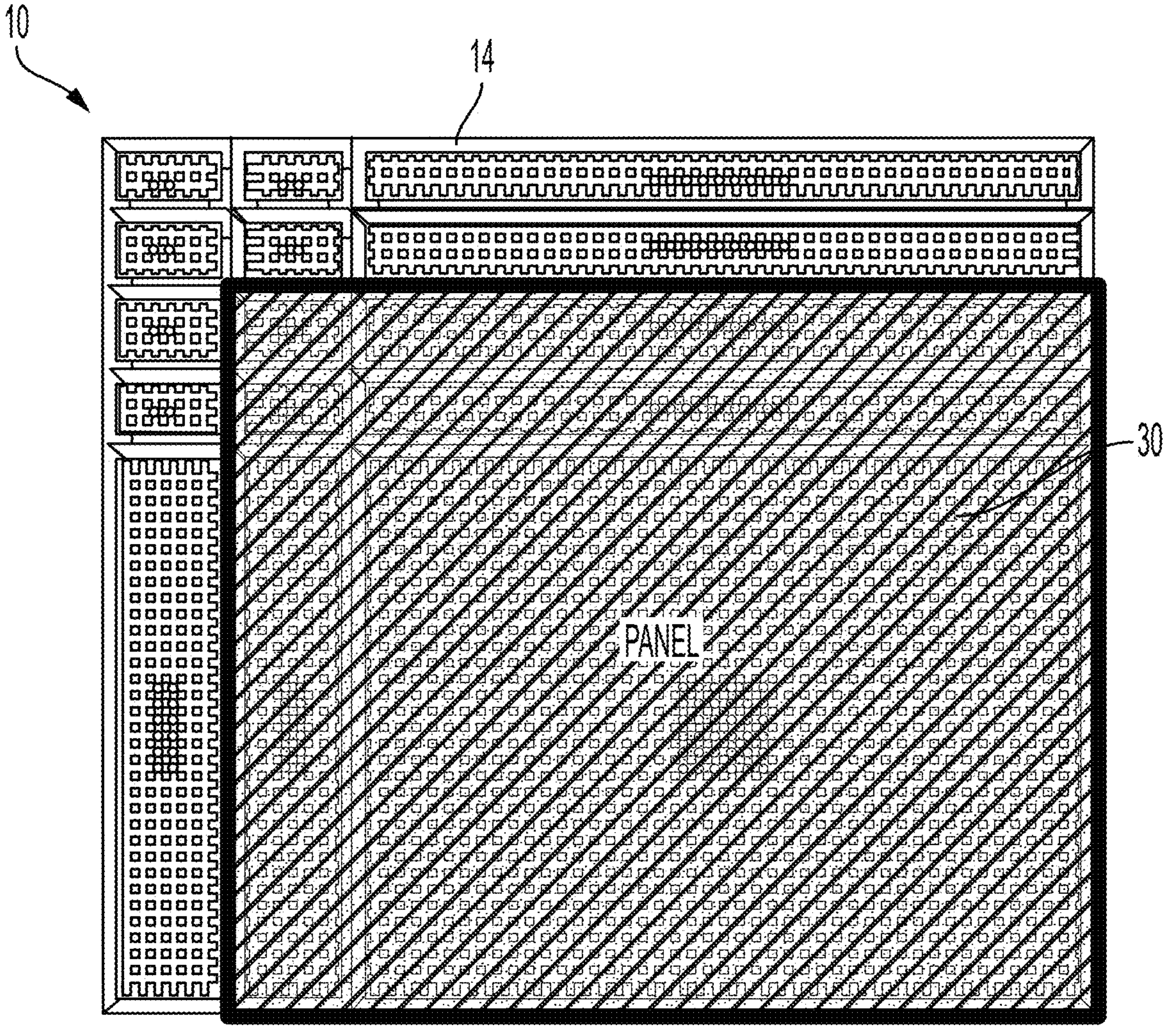
FIG. 4 is a top view of the multi-format vacuum table illustrating one format of usage.
Figure 5:
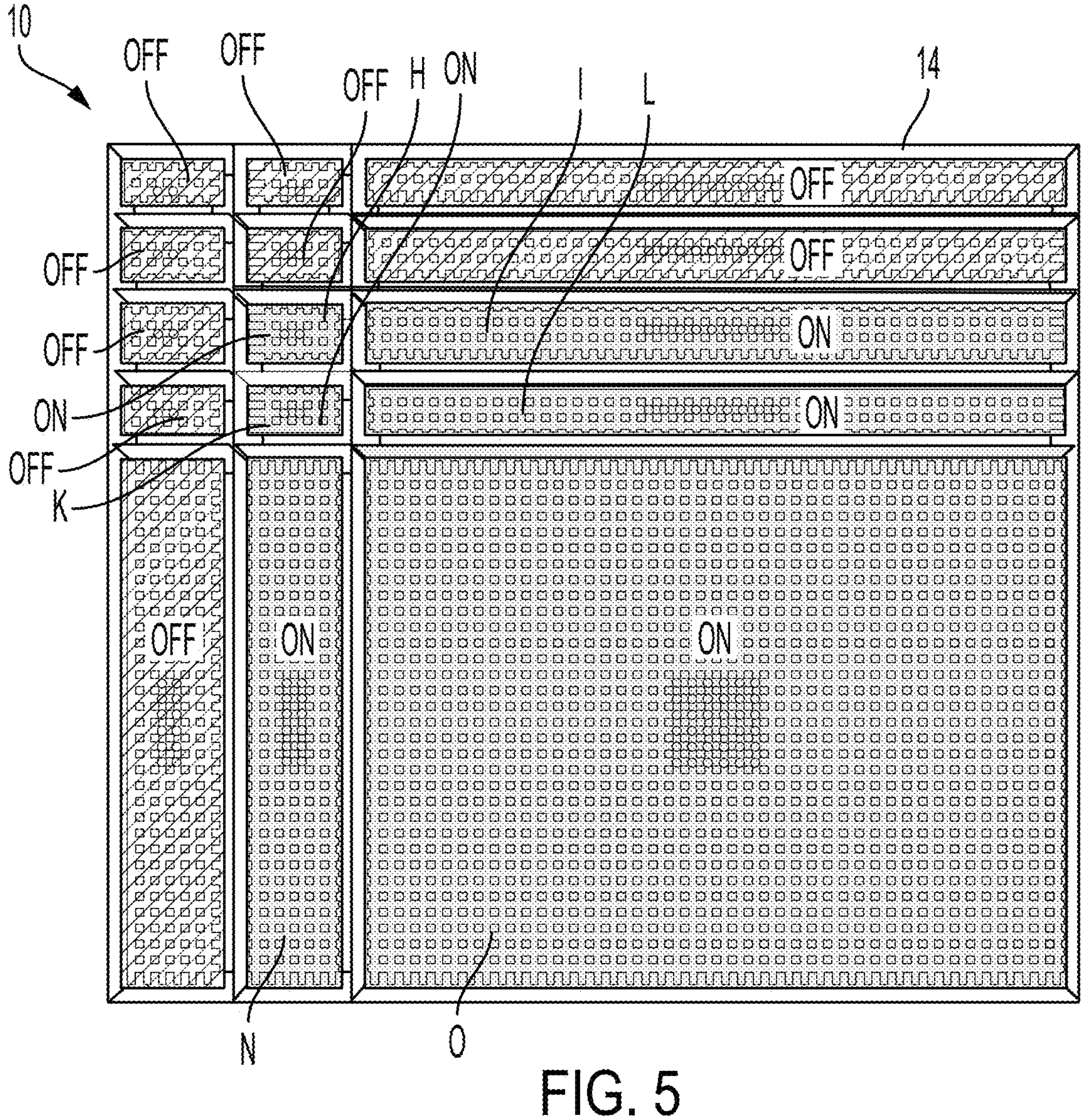
FIG. 5 is a top view of the multi-format vacuum table illustrating vacuum airflow during usage in the format shown in FIG. 4.
Figure 6:
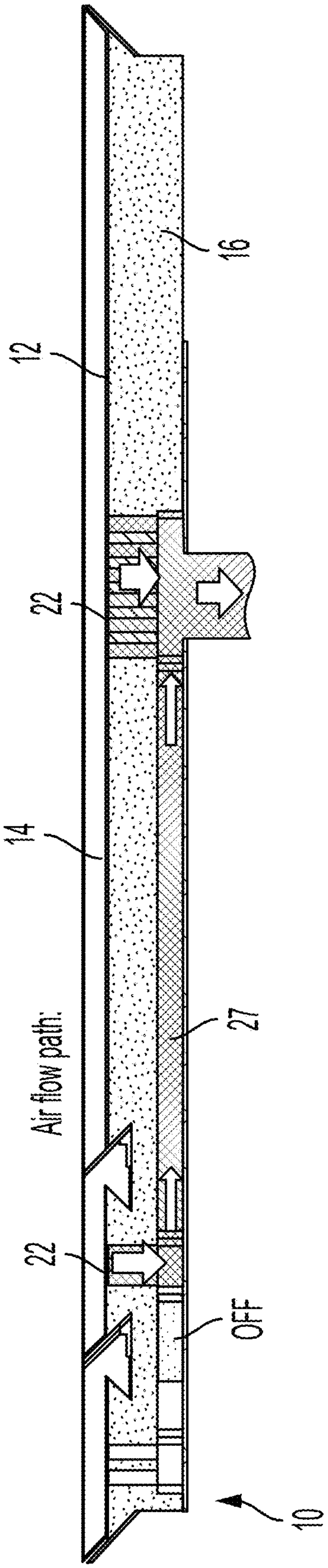
FIG. 6 is a front, elevation, cross-sectional view of the multi-format vacuum table illustrating airflow during usage in the format shown in FIGS. 4 and 5.

Referring now to FIGS. 4-6, an example of one vacuum airflow usage is shown. In the illustrated embodiment, an electronic component 30 of a particular size and format is placed on portions H, I, K, L, N and O of the vacuum table 10. The portions combine to form a format for the electronic component 30. This combination illustrates that any of the portions A-O may be combined to define a combined format for a large number of other electronic component sizes. Additionally, a single portion may be utilized to support, flatten and retain other electronic components.

As discussed above, a vacuum can be selectively applied to only desired portions of the vacuum table 10. In the case of the illustrated example, the vacuum is applied to the suction arrangements 22 for portions H, I, K, L, N and O. As shown in fluid circuit of FIG. 6, the controlled vacuum airflow is applied to desired portions (i.e., H, I, K, L, N and O in the illustrated example), while other portions do not have a vacuum applied in the particular vacuum usage of FIGS. 4-6.

Figure 7:
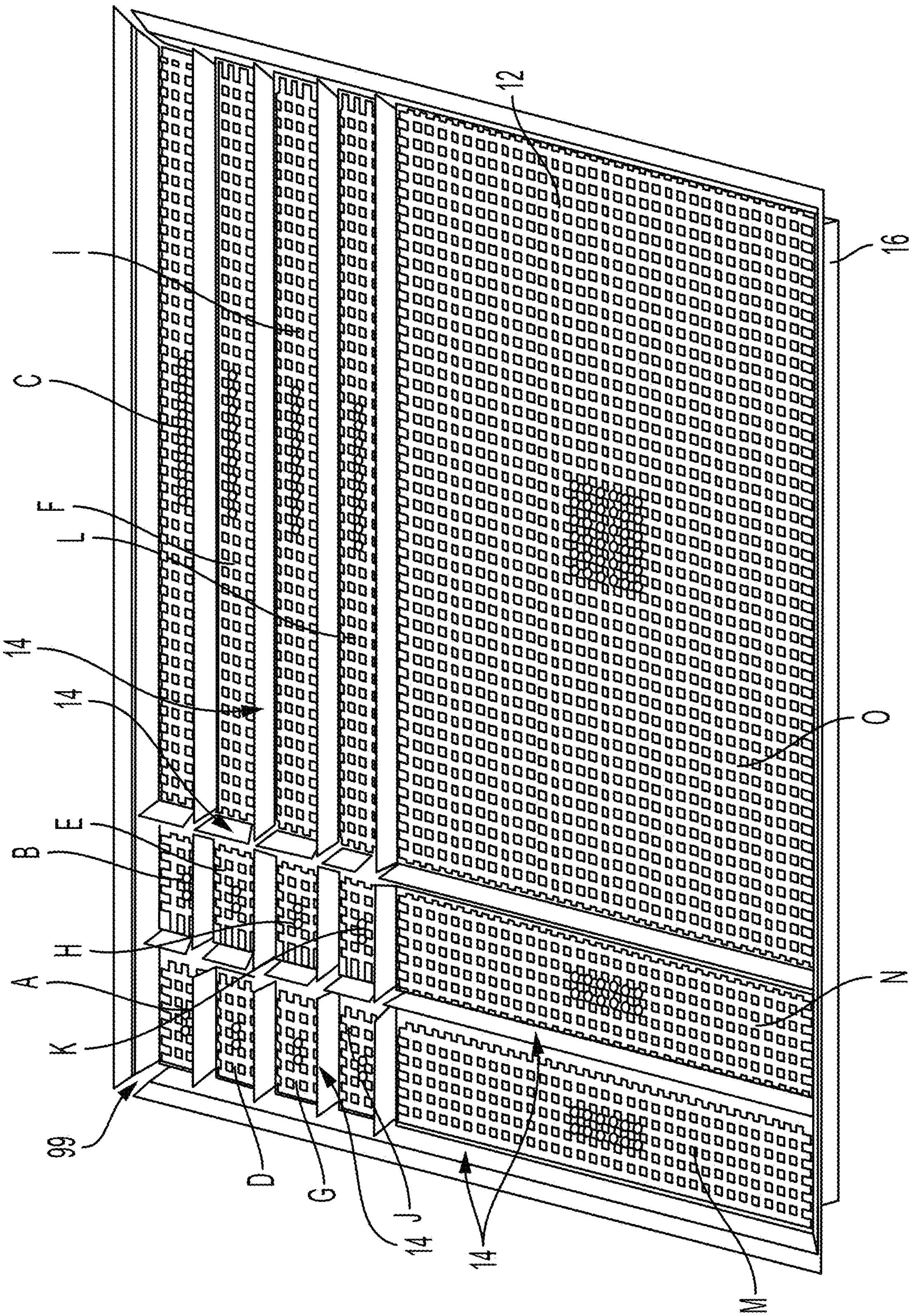
FIG. 7 is a top perspective view of the multi-format vacuum table according to another aspect of the disclosure.

The lip seals 14 prevent significant airflow leakage across the top surface 12 of the base plate structure 16, as would be present if simply a flat top surface was provided in an unsegmented manner. However, as shown in FIG. 7, a small gap 99 between edges of adjacent lip seals 14 is present in some embodiments to permit flexure during deformation of the lip seals 14 during operation. While complete sealing is not required, the lip seals 14 provide an enclosed perimeter to produce a large vacuum force to flatten the electronic component 30 in a manner which substantially evenly distributes the stresses over the entire area of the electronic component 30. This flattening force is stronger than a clamp force and avoids the complexity and potential for damage that clamp devices pose.

In the embodiment shown in FIG. 1, the ends of the lip seals 14 engage each other. For example, the first end 122 of the first lip seal 120 engages the second end 142 of the fourth lip seal 138. However, in the embodiment of FIG. 7, the ends of the lip seals are spaced apart from each other to define the gap 99. For example, the first end 122 of the first lip seal 120 is spaced from the second end 142 of the fourth lip seal 138. It is to be appreciated that any combination of lip seal engagement or gaps may be present. Specifically, all of the lip seal ends may be in contact in some embodiments, all of the lip seal ends may define gaps 99, or only some of the lip seal ends may be in contact, while others define gaps 99.

Advantageously, the lip seals 14 are located to provide a large number of possible perimeters for numerous formats of electronic components without the need to use various master plates. Additionally, as noted above, the vacuum table 10 provides effective flattening capability without the need for complex and potentially damaging clamps.

While the invention has been described in detail in connection with only a limited number of embodiments, it is to be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Moreover, any feature, element, component or advantage of any one embodiment can be used on any of the other embodiments. Accordingly, the invention is not to be seen as limited by the foregoing description.

What is claimed is:

1. A vacuum table for supporting and flattening an electronic component, the vacuum table comprising:

a base plate structure comprising a top surface defining a plurality of suction arrangements;

a plurality of lip seals operatively coupled to the base plate structure and extending upwardly beyond the top surface of the base plate structure, the plurality of lip seals arranged to define a plurality of portions of the vacuum table, wherein each of the plurality of portions of the vacuum table includes at least one of the plurality of suction arrangements therein, wherein each of the plurality of suction arrangements comprises a plurality of holes extending from the top surface of the base plate structure to an airflow path network defined within the base plate structure; and a plurality of valves positioned within the airflow path network to selectively control airflow to each of the plurality of suction arrangements.

2. The vacuum table of claim 1, wherein each of the plurality of lip seals are partially disposed within a respective recessed area of the base plate structure.

3. The vacuum table of claim 2, wherein the plurality of lip seals are secured to the base plate structure with a mechanical fastener in the recessed area.

4. The vacuum table of claim 2, wherein the plurality of lip seals are secured to the base plate structure magnetically.

5. The vacuum table of claim 1, wherein the plurality of lip seals extend upwardly at a non-perpendicular angle relative to a plane defined by the top surface of the vacuum table.

6. The vacuum table of claim 5, wherein the plurality of lip seals extend upwardly at an angle 45 degrees relative to a plane defined by the top surface of the vacuum table.

7. The vacuum table of claim 1, wherein the plurality of lip seals are formed of an elastomeric material.

8. The vacuum table of claim 1, wherein ends of adjacent lip seals of the plurality of lip seals define a gap therebetween.

9. A vacuum table for supporting and flattening an electronic component, the vacuum table comprising:

a base plate structure comprising a top surface and defining one or more interconnected channels and a plurality of through holes, the plurality of through holes extending from the plurality of interconnected channels and through the top surface of the base plate structure, and the plurality of through holes comprising a first suction arrangement and a second suction arrangement fluidly connected by the one or more interconnected channels;

a first valve positioned in the one or more interconnected channels, the first valve configured to selectively control airflow from the first suction arrangement to the second suction arrangement; and a plurality of lip seals coupled to the top surface and arranged to create a plurality of portions of the vacuum table, the first suction arrangement extending into a first portion of the plurality of portions, and the second suction arrangement extending into a second portion of the plurality of portions.

10. The vacuum table of claim 9, wherein each of the plurality of lip seals are partially disposed within a respective recessed area of the base plate structure.

11. The vacuum table of claim 10, wherein the plurality of lip seals are secured to the base plate structure with a mechanical fastener in the recessed area.

12. The vacuum table of claim 11, wherein the plurality of lip seals are secured to the base plate structure magnetically.

13. The vacuum table of claim 12, wherein the plurality of lip seals extend upwardly at a non-perpendicular angle relative to a plane defined by the top surface of the vacuum table.

14. The vacuum table of claim 13, wherein the plurality of lip seals extend upwardly at an angle 45 degrees relative to a plane defined by the top surface of the vacuum table.

15. The vacuum table of claim 14, wherein the plurality of lip seals are formed of an elastomeric material.

16. The vacuum table of claim 9, wherein ends of adjacent lip seals of the plurality of lip seals define a gap therebetween.

* * * * *